Nov. 19, 1968  V. F. FITZPATRICK  3,411,987
DEVICE FOR MEASURING THE DEPOSITION OF SOLIDS
IN NUCLEAR REACTORS
Filed Dec. 6, 1967
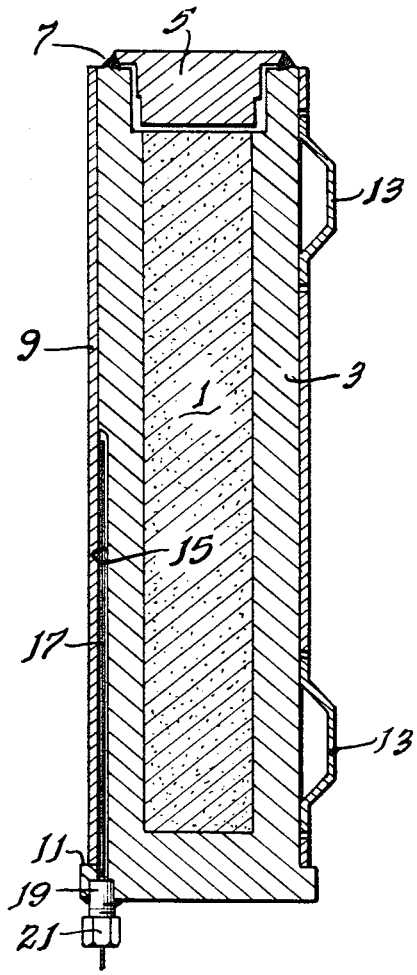
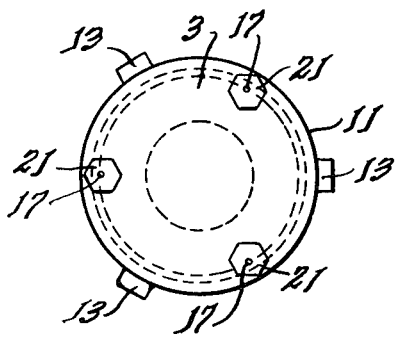
Inventor
Vincent F. Fitzpatrick
BY:
Attorney

United States Patent Office 3,411,987
Patented Nov. 19, 1968

3,411,987
DEVICE FOR MEASURING THE DEPOSITION OF SOLIDS IN NUCLEAR REACTORS
Vincent F. FitzPatrick, Richland, Wash., assignor to the United States of America as represented by the United States Atomic Energy Commission
Filed Dec. 6, 1967, Ser. No. 688,481
4 Claims. (Cl. 176—68)

ABSTRACT OF THE DISCLOSURE

A special nuclear fuel element is employed for measuring the deposition of solids on fuel element surfaces in nuclear reactors. A core which is highly enriched in uranium-235, uranium-233 or plutonium-239 is surrounded by a heavy cladding of nonfissionable material having a fairly high capture cross section for neutrons. This gives substantially constant heat generation over a long period of time. A thin jacket surrounds the cladding. A thermocouple between the jacket and the cladding measures the temperature at that point. Increases in the difference between this temperature and the temperature of the coolant surrounding the device indicate the amount of deposition on the fuel element surface.

Contractural origin of the invention

This invention was made in the course of or under a contract with the United States Atomic Energy Commission.

Background

The deposition of solids on the fuel elements of nuclear reactors produces problems in operation, since it decreases the rate of transfer of heat from the fuel to the coolant. This may result in overheating and damage to the fuel or its cladding.

The type and source of the solids vary with the type of reactor. In water-cooled reactors the solids are particulate corrosion products which are released to the coolant stream. It has been found that the particles tend to deposit on sources of intense radiation and on hot surfaces. The fuel elements are therefore deposition sites. In organic-cooled reactors, decomposition of the coolant under heat and irradiation produces deposits of solids or tar-like material. In liquid-metal-cooled reactors, deposition of solids results from erosion and dissolution of piping surfaces.

It is, therefore, desirable to have instrumentation which will indicate and measure the accumulation of solids on fuel element surfaces.

Summary of invention

My invention consists of a specially constructed and instrumented fuel element which is designed to operate at a substantially constant heat flux under a given neutron flux over a long period of time as compared to normal fuel elements. It is covered by a thin jacket within which are one or more thermocouples. The temperature of the coolant is measured by other instrumentation, and the difference in temperature of the fuel element thermocouple and the coolant temperature is a measure of the heat transfer through the jacket and the accumulated solids. By making the jacket thin and, preferably, of a metal having good heatconductivity, the device is made sensitive to the accumulation of solids.

Constant power generation is obtained in the fuel element by using highly enriched fuel and providing a heavy cladding between the thermocouple and the fuel, the cladding being of material having a capture cross section for neutrons of the predominant velocity present in the external flux, which is high compared to such materials as aluminum and zirconium, but low compared to such materials as boron and cadmium. For example, in a power reactor utilizing a uranium fuel containing 2.0 atomic percent U-235 and provided with a cladding giving a minimal absorption of neutrons, this detector may utilize fuel containing 10 atomic percent U-235 and a cladding so selected as to thickness and material that the average neutron flux in the fuel is about ⅕ the external neutron flux.

The change in power generation by the fuel in the test device would be very slow.

Description of drawing

FIGURE 1 is a longitudinal section through the device.
FIGURE 2 is a bottom view of the structure shown in FIGURE 1.

Detailed description

The drawing shows a detecting device comprising a body of fissionable material 1, surrounded by a heavy cladding 3. The end cap 5 closes the end of cladding 3. The end cap is welded in place at 7. The cylindrical surface of cladding 5 is covered by a thin jacket 9, which abuts on annular shoulder 11 formed on cladding 3 at the end opposite end cap 1. A plurality of supports 13 welded to the cladding 3 may be provided to space the fuel element from the surrounding process tube (not shown) through which coolant flows. Preferably, jacket 9 is shrunk onto cladding 3, but is not bonded thereto, so that it can be removed for chemical or physical examination.

One or more grooves 15 on the periphery of cladding 13 form with jacket 9 wells in which thermocouple 17 are seated. Plugs 19 welded in seats in shoulder 11 are provided with central bores aligned with grooves 11. Compression seals 21 seal the thermocouple wires in the bores.

In a specific example, the body of fissionable material 1 was 6 inches long and 0.925 inch in diameter and contained 664 grams of $UO_2$ in which 4.5 percent of the uranium atoms were U-235. The cladding 3 was 310 stainless steel and was 0.228 inch thick. The jacket 9 was zircaloy-2, 0.010 inch thick. Three thermocouples were employed. The device was used in a water-cooled thermal reactor having a flux typical of water cooled power reactors.

A reactor in which this device may be employed is shown in U.S. Patent No. 2,708,556, granted May 17, 1955, to Enrico Fermi et al., particularly FIGURES 37–39 and columns 42–44 of the specification.

Numerous variations may be made in the above details depending on the operating conditions.

The fissionable material 1 may be metallic uranium various uranium or plutonium alloys, uranim oxide, mixtures of uranium and plutonium oxides, or cermets of $UO_2$ or $PuO_2$ in stainless steel or various other metals. The cladding 3 may be other stainless steels, nickel, nickel-cobalt alloys, titanium, etc. It is desirable that the cladding be of a material having an average microscopic capture cross section in the range of about 1 to 40 barns and be highly resistant to corrosion by the coolant employed. The jacket 9 may be aluminum, stainless steel or zirconium alloys.

In relation to the fuel employed in the reactor, the fissionable material 1 should have a concentration of fissionable atoms (U-233, U-233, Pu-239, Pu-241 or mixtures thereof) which is greater by at least three times. The cladding 3 should then be selected in accordance with its neutron capture cross section, its thermal conductivity, and the thermal conductivity of the fissionable material, so that the heat flux at the surface will be the same as that of the normal fuel elements. The jacket 9 should ordinarily be of the same material as the exterior surface of the elements which are to be monitored, either the normal fuel elements or experimental or prospective fuel elements, in order to assure that the solid deposition on the test device will be representative.

In order to provide a beta flux that will be representative of normal fuel elements, a beta flux can be generated by placing a thin foil of silver or rhodium between the jacket 9 and cladding 3. These materials undergo reactions with thermal neutrons, producing short-lived beta-emitters. The intensity of the beta flux at the surface of the jacket is controlled by varying the jacket thickness, foil thickness, or foil material. There are indications that the deposition of solids is influenced by the beta flux.

The embodiments of the invention in which an exclusive property or privilege is claimed are defined as follows:

1. A device for measuring the deposition of solids in a nuclear reactor comprising:
    (a) a body fissionable material having a concentration of fissionable atoms at least three times that of natural uranium;
    (b) a cladding surrounding said fissionable material of material having an average microscopic capture cross section for neutrons in the range of about 1 to 40 barns and having a thickness sufficient to reduce the flux within the fissionable material to not more than one-third that outside the cladding;
    (c) a thin jacket at least partially enclosing said cladding; and
    (d) at least one temperature-measuring means between said cladding and said jacket.

2. A device as defined in claim 1 wherein said temperature-measuring means is a thermocouple.

3. A device as defined in claim 1 and further comprising a foil between said cladding and said jacket, said foil comprising material which produces beta radiation when irradiated by neutrons.

4. In a nuclear reactor wherein fuel elements containing fissionable material are cooled by a fluid, the improvement comprising a device for measuring the deposition of solids on said fuel elements, said device being positioned in said fluid and comprising:
    (a) a body of fissionable material having a concentration of fissionable atoms at least three times that in said fuel elements;
    (b) a cladding surrounding said fissionable material of material having an average microscopic capture cross section for neutrons in the range of about 1 to 40 barns and having a thickness sufficient to reduce the flux within the fissionable material to not more than one-third that outside the cladding;
    (c) a thin jacket at least partially enclosing said cladding; and
    (d) at least one temperature-measuring means between said cladding and said jacket.

References Cited
UNITED STATES PATENTS

| | | | |
|---|---|---|---|
| 2,856,341 | 10/1958 | Kanne | 176—68 |
| 3,021,274 | 2/1962 | Fifield et al. | 176—19 |
| 3,132,077 | 5/1964 | Turovlin | 176—68 |

BENJAMIN R. PADGETT, *Primary Examiner.*

M. J. SCOLNICK, *Assistant Examiner.*